United States Patent [19]

Kojima et al.

[11] 4,435,840

[45] Mar. 6, 1984

[54] RADIO MOBILE COMMUNICATION SYSTEM WHEREIN PROBABILITY OF LOSS OF CALLS IS REDUCED WITHOUT A SURPLUS OF BASE STATION EQUIPMENT

[75] Inventors: Junichiroh Kojima; Kenji Mizoe, both of Tokyo, Japan

[73] Assignee: Nippon Electric Co., Ltd., Tokyo, Japan

[21] Appl. No.: 388,367

[22] Filed: Jun. 14, 1982

[30] Foreign Application Priority Data

Jun. 22, 1981 [JP] Japan .................................. 56-95196
Mar. 19, 1982 [JP] Japan .................................. 57-44897
Apr. 5, 1982 [JP] Japan .................................. 57-57071

[51] Int. Cl.$^3$ ............................................. H04B 1/00
[52] U.S. Cl. .................................... 455/33; 455/56; 179/2 EB
[58] Field of Search .......................... 455/33, 54, 56; 179/2 EA, 2 EB

[56] References Cited

U.S. PATENT DOCUMENTS

| | | | |
|---|---|---|---|
| 3,663,762 | 5/1972 | Joel, Jr. .............................. | 455/33 |
| 3,913,017 | 10/1975 | Imaseki .............................. | 455/33 |
| 4,144,412 | 3/1979 | Ito et al. ........................... | 455/33 |
| 4,308,429 | 12/1981 | Kai et al. ........................... | 455/33 |

FOREIGN PATENT DOCUMENTS 55-53980  4/1980  Japan ..................................... 455/33

*Primary Examiner*—Jin F. Ng
*Attorney, Agent, or Firm*—Sughrue, Mion, Zinn, Macpeak & Seas

[57] ABSTRACT

In a mobile radio communication system, a control station supplies a traffic adjusting signal to a particular one of base stations, channels allotted to which are used up to a predetermined number in communication therethrough between the control station and mobile stations in the service area thereof provided that some of the channels allotted to an adjacent base station are idle. The signal narrows the service area of the particular base station as by reducing the base station output power. Alternatively, the signal varies a communicable distance of each mobile station in the service area of the particular base station. For example, the signal makes the particular base station raise the mobile station output power to make some of the mobile stations carry out the communication through the adjacent base station. As a further alternative, the signal varies both the service area and the communicable distance. For example, the signal makes the particular base station raise the reference level used in communication therethrough. Instead, a lower reference level is developed in each mobile station for use in communication through the adjacent base station.

5 Claims, 14 Drawing Figures

RADIO MOBILE COMMUNICATION SYSTEM WHEREIN PROBABILITY OF LOSS OF CALLS IS REDUCED WITHOUT A SURPLUS OF BASE STATION EQUIPMENT

BACKGROUND OF THE INVENTION

This invention relates to a radio mobile communication system and, in particular, to a communication system for use in communicating with a land mobile or mobiles.

A conventional mobile communication system of the type described comprises a control station and a plurality of base stations controlled by the control station. Each of the base stations defines a service area which partly overlaps at least one adjacent service area. Each mobile station is communicable with a selected one of the base stations in a selected one of the service areas that is allotted to the selected base station, unless traffic congestion occurs in the selected base station. This applies to the case where each mobile station enters the selected service area from a neighboring service area.

Each base station has a capacity of equipment designed in accordance with an estimated traffic predetermined in consideration of probability of loss of calls. This means that traffic congestion takes place in the selected base station when an actual traffic is concentrated on the selected base station over the capacity of equipment. During the traffic congestion, the selected base station cannot handle any other calls in the selected service area longer. Moreover, it is not possible for the selected base station to track a mobile station that has entered the selected service area. The probability of loss of calls is, therefore, high with the conventional system. In addition, a difference between the actual traffic and the estimated traffic brings about a shortage or a surplus of equipment in each base station. Anyway, such conventional system lacks the flexibility of equipment.

SUMMARY OF THE INVENTION

It is an object of this invention to provide a radio mobile communication system in which a reduction is possible in the probability of loss of calls.

It is another object of this invention to provide a system of the type described, which has an excellent flexibility of performance.

It is another object of this invention to provide a system of the type described, which has a high utilization factor of equipment.

A mobile radio communication system to which this invention is applicable comprises a control station and a plurality of base stations controlled by the control station and having service areas, respectively. Each service area partly overlaps at least one of the other service areas. Each base station is allotted with a plurality of channels for use in radio communication with a plurality of mobile stations which are present in the service area of each base station and each of which has a communicable distance. The number of channels currently used in the radio communication defines a current traffic for each base station. According to this invention, the control station comprises threshold means for generating a threshold signal representative of a threshold traffic predetermined for each base station, measuring means coupled to the base stations for measuring the current traffics for the respective base stations to produce a plurality of traffic signals representative of the measured current traffics, respectively, and monitoring means coupled to the base stations and responsive to the threshold signal and the traffic signals for monitoring the measured current traffics with at least one threshold traffic predetermined for the base stations to supply a traffic adjusting signal to a particular one of said base stations when the current traffic defined for the particular base station exceeds the threshold traffic predetermined therefor and furthermore when the current traffic defined for an adjacent one of the base stations, the service area of which partly overlaps the service area of the particular base station, does not exceed the threshold traffic for said adjacent base station. The system further comprises varying means operable in at least a predetermined one of first and second modes of operation in response to the traffic adjusting signal. In the first mode of operation, the varying means varies the service area of the particular base station. In the second mode of operation, the varying means varies the communicable distance of each mobile station present in the service area of the particular base station.

DESCRIPTION OF THE PREFERRED EMBODIMENTS

Figure 1:
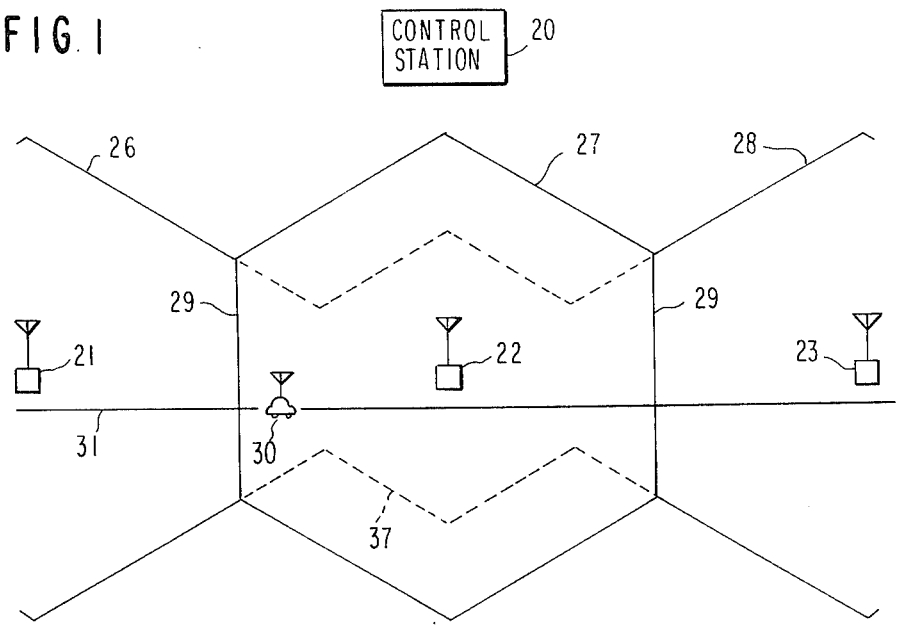
FIG. 1 is a diagrammatical view for describing a radio mobile communication system according to a first embodiment of this invention.

Referring to FIG. 1, a radio land mobile communication system according to a first embodiment of this invention comprises a control station 20 and a plurality of base stations three of which are illustrated in this figure and will hereinafter be referred to as first, second, and third base stations 21, 22, and 23. The system is operable in a congestion mode during traffic congestion, as will later be described, or in a normal mode of operation during absence of traffic congestion. The first through third base stations 21 to 23 are actually connected to the control station 20 through wired circuits (not shown) and controlled by the control station 20 through the wired circuits.

In the normal mode of operation, the first through third stations 21 to 23 have first through third service areas 26, 27, and 28, respectively. Each service area partly overlaps at least one of the other service areas with boundaries 29 formed between two adjacent areas as will become clear as the description proceeds.

A plurality of channels are allotted to each base station for use in radio communication with a plurality of mobile stations which are present in the service area of the base station under consideration. The channels allotted to each base station include a control channel for use in controlling each mobile station present in the service area thereof and a plurality of speech channels for transmitting speech signals between each mobile station and the control station 20 through that base station. The mobile stations are typified by a single mobile station 30 present in the service area 27. It is assumed merely for simplicity of description that the mobile station 30 runs along a straight running path 31 extending from the first service area 26 to the third service area 28. It should be noted here that the mobile station 30 has a communicable distance as will later be described.

Figure 2:
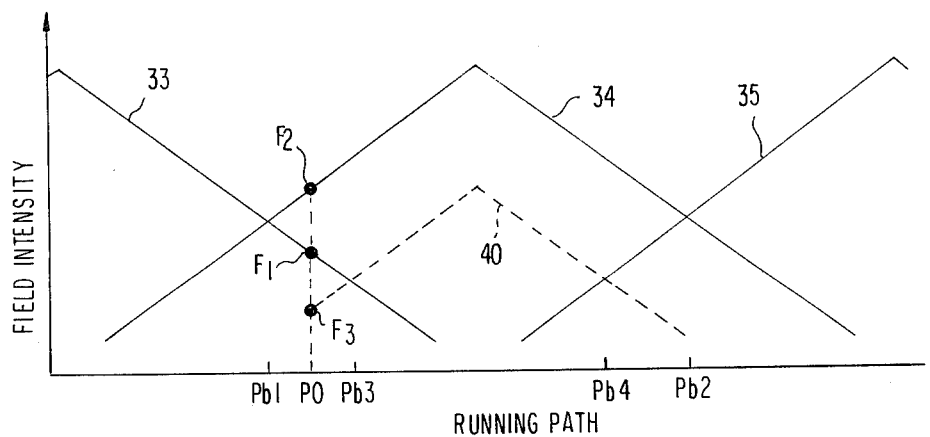
FIG. 2 shows a graphical representation for illustrating a distribution of field intensity along a running path illustrated in FIG. 1.

Referring to FIG. 2, each base station sends a particular transmission signal through each control channel. Such particular transmission signals transmitted from the base stations 21 through 23 have field intensities which vary along the running path 31 as depicted by curves 33, 34, and 35, respectively. The particular transmission signals may be called base station specifying signals for specifying the respective base stations 21 through 23. The mobile station 30 searches for the base station specifying signals and measures the field intensities 33 through 35 to select one of the base stations 21 through 23 to communicate therethrough with the control station 20.

As shown in FIGS. 1 and 2, the field intensity gradually becomes low as the mobile station 30 recedes from each base station. The boundary 29 is defined by positions, such as $Pb_1$ and $Pb_2$, at which the field intensities of the base station specifying signals sent from two adjacent base stations, such as 21 and 22, become equal to each other.

In the normal mode of operation, every base station, in particular, the second base station 22 has at least one unused or idle speech channel. In the presence of the idle channel or channels, the base station 22 informs the mobile station 30 of the fact through the control channel by the use of an idle channel indication signal, which is known in the art and will not be described in detail.

It is surmised that the mobile station 30 is present in the service area 27 at a point $P_0$ which is near to the boundary 29 between the service areas 26 and 27. In FIG. 2, the mobile station 30 receives the base station specifying signals with field intensities $F_1$ and $F_2$ from the first and the second base stations 21 and 22, respectively. The base station specifying signal can scarcely be received from the third base station 23. Inasmuch as the field intensity $F_1$ if lower at the point $P_0$ than the field intensity $F_2$, the mobile station 30 selects the second base station 22 to communicate therewith if the idle channel indication signal is received therefrom as surmised hereinabove.

Similar operation is carried out in the service areas 26 and 28 as long as any idle speech channel is left in the channels allotted to each of the first and the third base stations 21 and 23. If the idle speech channel is present in the second base station, the mobile station 30 is communicable through the second base station when the mobile station 30 moves from the service area 26 of the first base station 21 to the service area 27 of the second base station 22.

If no idle speech channel is present in the second base station 22 because of traffic congestion, the mobile station 30 cannot communicate with the second base station 22 even when the idle channel is left in the channels allotted to the first and the third base stations 21 and 23. This results in the loss of call as pointed out hereinabove.

In order to avoid the loss of call without provision of a surplus of equipment in each base station, the illustrated system is operable in the congestion mode of operation when traffic congestion occurs in one of the base stations 21 through 23. More particularly, the service area 27 of the second base station 22 in which the traffic congestion takes place is narrowed relative to the service areas 26 and 28 contiguous to the service area 27, as shown by a broken line 37 in FIG. 1. The service area 27 is narrowed on condition that the idle channel remains in the first base station 21. Operation in the congestion mode like this will hereinafter be called a first mode of operation.

With the system according to the first embodiment of this invention, operation in the first mode is accomplished by reducing a base station output power of the second base station 27. As a result of the reduction, the field intensity 34 along the running path 31 is changed to a new field distributions depicted by a broken line 40 in FIG. 2. New boundaries are formed at positions $Pb_3$ and $Pb_4$. Thus, the service area 27 is narrowed while each of the service areas 26 and 28 is widened in effect as shown by dashed lines in FIG. 1. Under the circumstances, the mobile station 30 present at the point $P_0$ receives the base station specifying signal with a field intensity $F_3$ from the second base station 27. Inasmuch as the field intensity $F_3$ is lower than the field intensity $F_1$, the mobile station 30 becomes communicable with the control station 20 through the first base station 21. This means that calls to be connected from mobile stations in the original service area 27 to the second base station 22 are dispersed in a peripheral region of the service area 27 in question into a service area, such as the first service area 26, adjacent to the service area 27. It is, therefore, possible to reduce probability of loss of calls even with no surplus of equipment in each base station.

Figure 3:
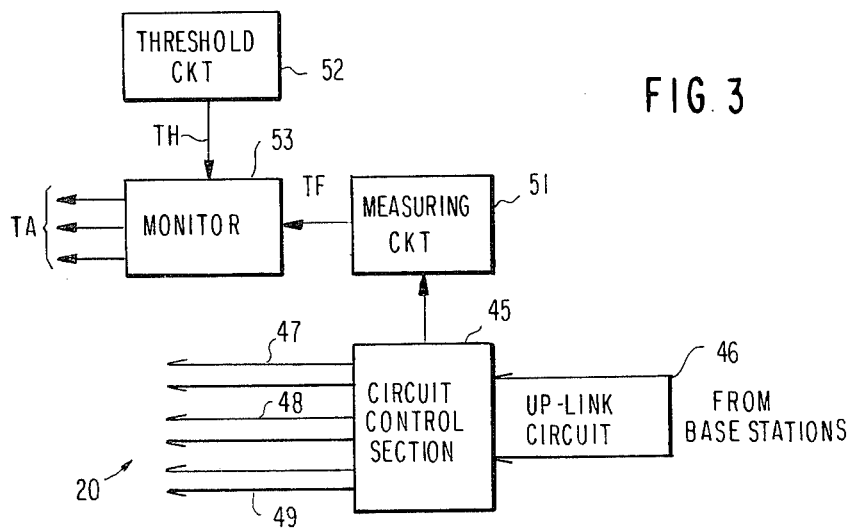
FIG. 3 is a block diagram of a control station for use in the system illustrated in FIG. 1.

Referring to FIG. 3, the control station 20 used for the system according to the first embodiment of this invention comprises a circuit control section 45, an up-link circuit 46 extended in the wired circuits from each of the base stations 21, 22, and 23, and a plurality of down-link circuits 47, 48, and 49 also in the wired circuits for the respective base stations 21, 22, and 23. The up-link circuit 46 is for use in transmitting up-link signals from each base station to the control station 20 through each control channel and each speech channel.

The down-link circuits 47, 48, and 49 are for use in delivering down-link signals to the respective base stations through control channel and speech channels. The above-mentioned structure is similar to that of a conventional system. Therefore, description will be omitted about the circuit control section 45, the up-link circuit 46, and the down-link circuits 47 through 49.

In order to put the system into the first mode of operation, a current or instantaneous traffic should be measured for each base station. The current traffic is defined for each base station by the number of the speech channels currently used in radio communication between the control station 20 and the mobile stations, such as 30, which are present in the base station in question. The number is known in the control station 20 by watching the up-link circuit 46 as will presently be described.

In FIG. 3, the illustrated control station 20 comprises a traffic measuring circuit 51 coupled to the base stations 21, 22, and 23 through the circuit control section 45 and the up-link circuit 46. The traffic measuring circuit 51 serves to measure the current traffics for the respective base stations 21 through 23 to produce a plurality of traffic signals TF representative of the measured current traffics, respectively, in a time division fashion. The traffic signals TF are produced from the traffic measuring circuit 51 one at a time.

The control station 20 further comprises a threshold circuit 52 for generating a threshold signal TH representative of a threshold traffic predetermined for each base station. The threshold traffic is determined in accordance with a utilization factor of equipment of each base station and may or may not differ from base station to base station.

A monitoring circuit 53 is coupled to the threshold circuit 52 and the traffic measuring circuit 51 to receive the threshold signal TH and the traffic signals TF. The measured current traffics are successively monitored by referring to at least one threshold traffic predetermined for the base stations to deliver traffic adjusting signals TA to the base stations, respectively, through the wired circuits. The traffic adjusting signal supplied to each base station takes first and second signal values. The first and the second values may be specified either by a predetermined number of bits or by one and the other of two logic levels.

Each of the first and the second values appears in connection with the current traffic (to be called a first current traffic) defined for each base station 22 and the current traffic (to be called a second current traffic) defined for an adjacent one 21 of the base stations, the service area of which partly overlaps the service area of each base station 22. Specifically, the first signal value is selected by the monitoring circuit 53 when the first current traffic exceeds the threshold traffic predetermined therefor and the second current traffic does not exceed the threshold traffic for the adjacent base station 21. Otherwise, the second signal value is produced as the traffic adjusting signal TA.

In the example being illustrated in FIGS. 1 and 2, the first and the third base stations 21 and 23 are supplied with the second signal value as the traffic adjusting signal TA while the second base station 22, the first signal value. It is possible to refer to a traffic adjusting signal of the first signal value merely as a traffic adjusting signal, in which case it should be understood that the base stations supplied with the traffic adjusting signals of the second signal value are supplied with no traffic adjustment signal.

Figure 4:
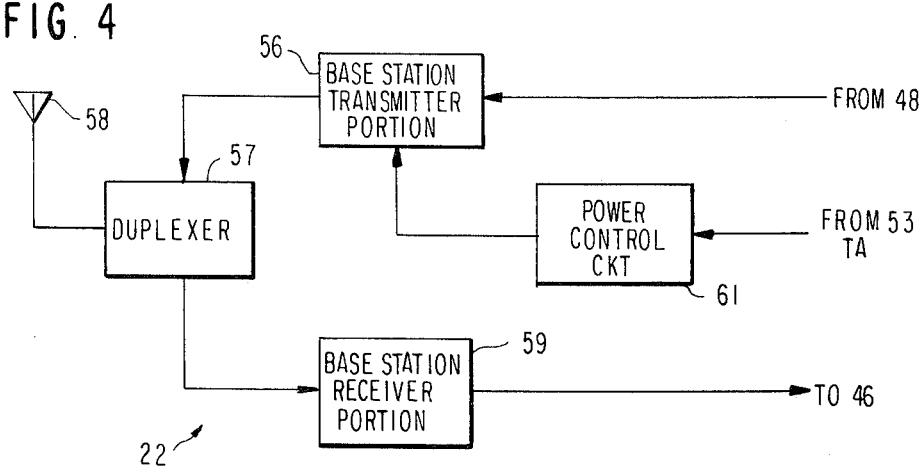
FIG. 4 is a block diagram of a base station for use in combination with the control station illustrated in FIG. 3.

Referring to FIG. 4, each base station, typically the second base station 22, comprises a base station transmitter portion 56 coupled to the down-link circuit 48 illustrated in FIG. 3 for carrying out radio transmission with a base station output power towards the mobile stations present in the service area 27. The service area 27 is defined by the output power. The down-link signal supplied from the down-link circuit 48 is sent to the mobile stations through the base station transmitter portion 56, a duplexer 57, and a base station antenna 58.

On the other hand, the up-link signal is received through the antenna 58 and the duplexer 57 by a base station receiver portion 59 and, thereafter, sent to the up-link circuit 46 illustrated in FIG. 3 is the usual manner.

It should be noted here that the base station transmitter portion 56 is a combination of a plurality of transmitters for the down-link signal including the control signal and the speech signals while the base station receiver portion 59, a combination of a plurality of receivers for the up-link signal including the other control signal and the other speech signals.

Now, let the second base station 22 be a particular one of the base stations that is supplied with a traffic adjusting signal TA from the monitoring circuit 53. The traffic adjusting signal TA is supplied to a power control circuit 61 coupled to the transmitter portion 56. It is possible to understand that a connection between the control circuit 61 and the monitoring circuit 53 is means for receiving a particular one of at least one traffic adjusting signals that is supplied to the particular base station 22 and that the particular traffic adjusting signal is received by the control circuit 61 as a received adjustment signal. The control circuit 61 reduces the base station output power. The service area 27 of the second base station 22 is thereby narrowed. The power control circuit 61 may, therefore, be referred to as a varying circuit for varying the service area.

With the system according to the first embodiment of this invention, each mobile station has the same structure as that of a conventional system. The description is, therefore, omitted in connection with the first embodiment.

Although the output power of the second base station 22 is reduced in the illustrated system, each output power of the first and the third base stations 21 and 23 may be augmented relative to that of the second base station 22.

Figure 5:
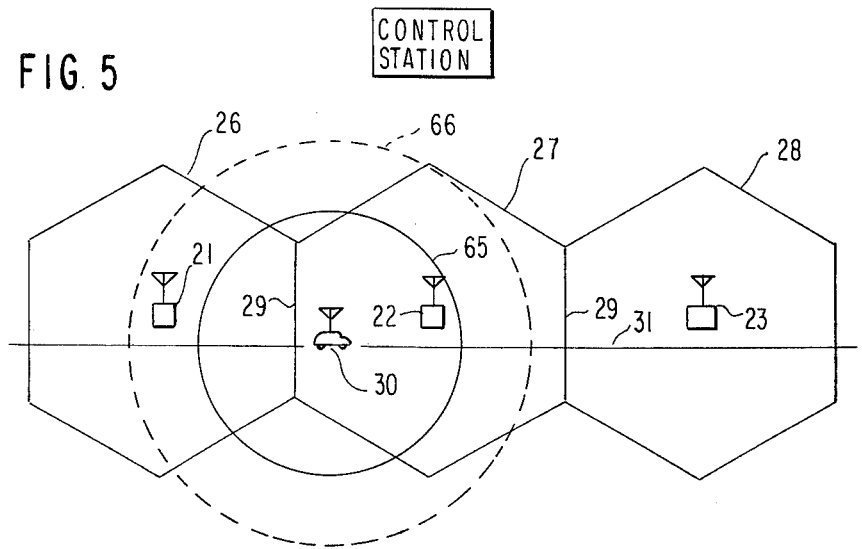
FIG. 5 is a diagrammatical view for describing a radio mobile communication system according to a second embodiment of this invention.
Figure 6:
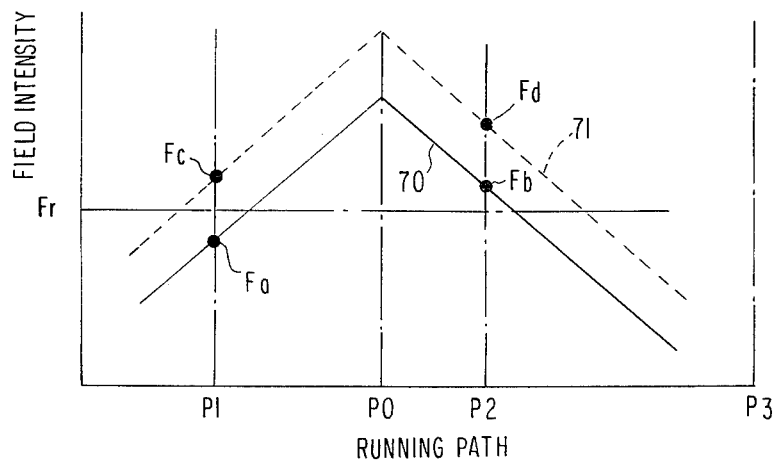
FIG. 6 shows a graphical representation for illustrating a distribution of field intensity.

Referring to FIGS. 5 and 6, a radio mobile communication system according to a second embodiment of this invention comprises similar parts designated by like reference numerals and is operable in a second mode of operation on occurrence of traffic congestion in one of the base stations, for example, the second base station 22. In the normal mode in which no traffic congestion occurs in the second base station 22, the mobile station 30 has a communicable distance which defines a communicable zone depicted by a solid-line circle 65. As will later be described, the illustrated mobile station 30 is communicable with the second base station 22 alone unless the communicable zone 65 is varied. In the second mode of operation, the communicable distance is lengthened to expand the communicable zone 65 to a communicable zone depicted by a broken-line circle 66 on occurrence of the traffic congestion in the second base station 22.

The communicable distance is lengthened by raising the output power of each mobile station in the second service area 27, namely, a mobile station output power. Alternatively, the communicable distance is lengthened by reducing a base station reference level of the second base station 22 for use, as will later be described, in detecting mobile stations which are present in the second service area 27. The reference level is exemplified in FIG. 6 at Fr. As a further alternative, the communication distance is lengthened by varying both the mobile station output power and the base station reference level Fr. It will be assumed in the following that the mobile station output power alone is varied with the reference level Fr kept constant.

The control channels mentioned to in conjunction with FIG. 1 are allotted with different frequencies in adjacent base stations, such as 21 and 22 or 22 and 23. It is well known in the art that each control channel is divided into down-link and up-link control channels directed from each base station towards each mobile station and from each mobile station towards each base station, respectively. In the illustrated system, occurrence of the traffic congestion is transmitted through the down-link control channel from the second base station 22 to the mobile stations, such as 30, in the second service area 27. Variation of the mobile station output power is detected by monitoring a field intensity of the up-link control channel at the second base station 22 with reference to the base station reference level Fr.

In the normal mode of operation, the mobile station 30 successively transmits mobile station control signals to the base stations, such as 21 through 23, through the respective up-link control channels of the respective base stations. It will be assumed that the control signals are transmitted with a common mobile station output power. Furthermore, it will be assumed that the straight running path 31 runs near the base stations 21 through 23. The control signals have a field intensity distribution depicted by a solid line 70. The field intensities at the mobile station 30 and the first and the second base stations 21 and 22 are given by ordinates at points $P_0$, $P_1$, and $P_2$, respectively.

The field intensities (depicted at Fa and Fb) at the points $P_1$ and $P_2$ are weaker than and stronger than the reception reference level Fr of each base station 21 or 22, respectively. Therefore, the mobile station 30 at the point $P_0$ is communicable with the second base station 22 alone.

When occurrence of the traffic congestion is transmitted from the second base station 22 to the mobile station 30 through the down-link control channel, the mobile station 30 lengthens the communicable distance by augmenting the mobile station output power. As a result, the field intensity distribution varies to that indicated by a dashed line 71. Both of the field intensities (depicted at Fc and Fd) at the points $P_1$ and $P_2$ are higher than the reception reference level Fr which is common to the base stations 21 and 22. The mobile station 30 at the point $P_0$ becomes communicable with the first and the second base stations 21 and 22.

Figure 7:
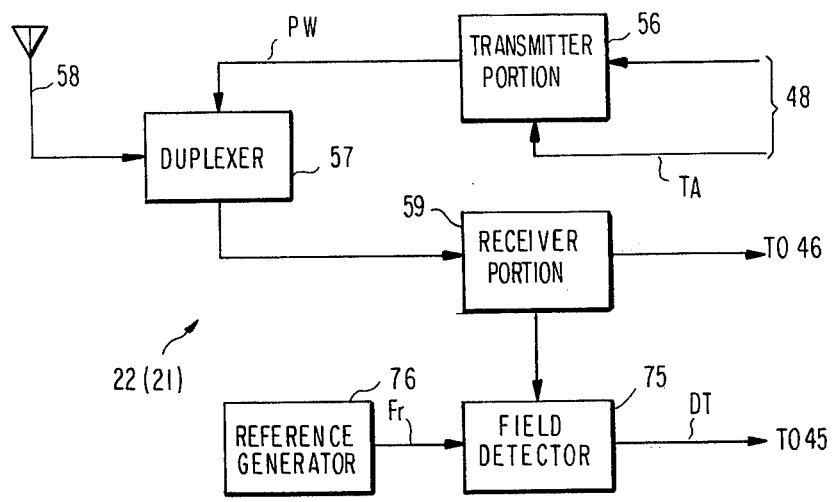
FIG. 7 is a block diagram of a base station for use in the system illustrated in FIG. 6.

Referring to FIG. 7, each base station for use in the system illustrated with reference to FIGS. 5 and 6 is typically depicted as the second base station 22. The base station 22 is similar to that illustrated with reference to FIG. 4 except that a field detector 75 is connected to the base station receiver portion 59 and to a reference generator 76 and that the power control circuit 61 shown in FIG. 3 is omitted. The reference generator 76 generates a reference signal Fr which is representative of the base station reference level Fr illustrated in FIG. 6 and which is designated by the same reference letter.

In this structure, the up-link control channel allotted to the second base station 22 is monitored by the field detector 75 through the antenna 58, the duplexer 57, and the receiver portion 59, so as to measure the field intensity of the up-link control channel with reference to the reference signal Fr. When the field intensity ecxeeds the reception reference level Fr, the field detector 75 produces a field detection signal DT.

Figure 8:
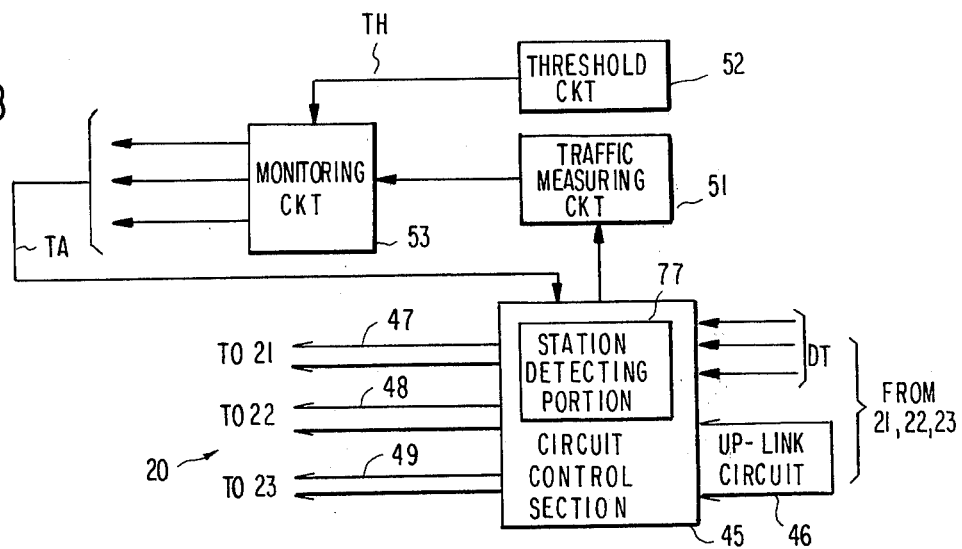
FIG. 8 is a block diagram of a control station for use in combination with the base station illustrated in FIG. 7.

Referring to FIG. 8, the control station 20 is for use in combination with each base station illustrated in FIG. 7 and comprises similar parts designated by like reference numerals. When the field detection signal DT is produced by the second base station 22, the control station 20 receives the field detection signal DT at the circuit control section 45. The circuit control section 45 detects, by the use of a station detecting portion 77, the second base station 22 which produces the field detection signal DT. After detection of the second base station 22, the circuit control section 45 energizes the traffic measuring circuit 51 to measure the current traffic for the second base station 22. The traffic measured in the current traffic measuring circuit 51 is monitored by the monitoring circuit 53 with reference to the threshold signal TH in the manner described in conjunction with FIG. 3.

In the normal mode, the current traffic does not exceed the threshold traffic predetermined by the threshold circuit 52 for the second base station 22. The control station 20 controls the second base station 22 so that the mobile station 30 is connected to the control station 20 through the wired circuits and through one of the channels which are allotted to the second base station 22. As a result, the second base station 22 informs the mobile station 30 of an idle one of the channels by producing an idle channel signal specifying the idle channel in a usual manner.

On the other hand, if the current traffic exceeds the threshold traffic, the monitoring circuit 53 supplies a traffic adjusting signal TA to the second base station 22. In the example being illustrated, the traffic adjusting signal TA is delivered to the second base station 22 through the circuit control section 45 and the down-link circuit 48.

Referring back to FIG. 7, the idle channel signal reaches the second base station 22 and through the wired connection and is transmitted through the transmitter portion 56, the duplexer 57, and the antenna 58 towards the mobile station 30 through the down-link.

On occurrence of the traffic congestion of the second base station 22, the traffic adjusting signal TA is supplied to the transmitter portion 56 of the second base station 22 as a received adjustment signal. The tramsitter portion 56 transmits a power control signal PW in response to the received adjustment signal towards the mobile station present in the service area 27 of the second base station 22. The power control signal PW specifies occurrence of the traffic congestion in the second base station 22, as described in conjunction with FIGS. 5 and 6. This means that the transmitter portion 56 serves to very the communicable distance, as will presently become clear.

Figure 9:
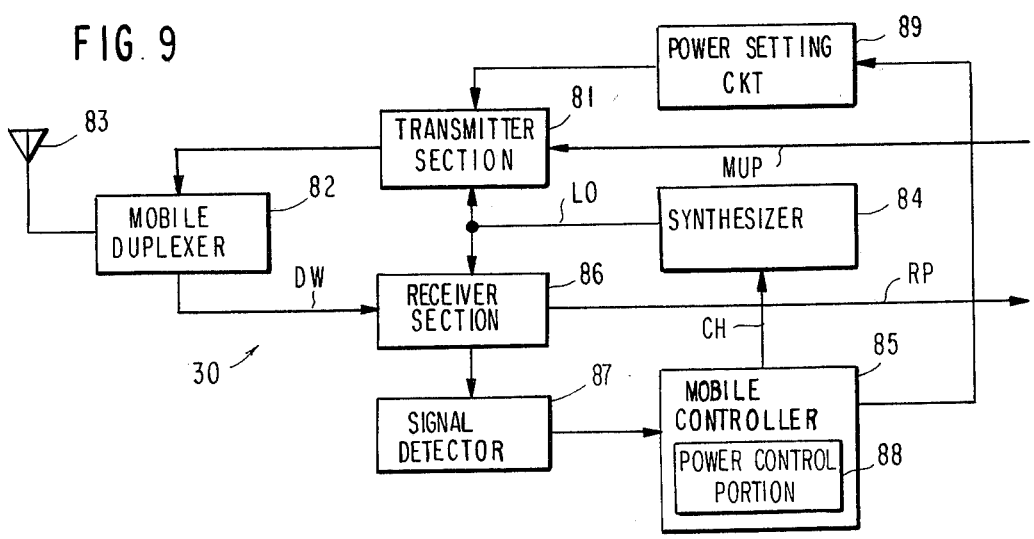
FIG. 9 is a block diagram of a mobile station communicable with the base station illustrated in FIG. 8.

Referring to FIG. 9, the mobile station 30 comprises a transmitter section 81 responsive to a mobile up-link signal MUP for transmitting the same through a mobile duplexer 82 and a mobile antenna 83 towards the base stations, such as 21 and 22. The mobile up-link signal MUP includes channel indicating signals and speech signals.

The transmitter section 81 is supplied with a local oscillation signal LO from a synthesizer 84 controlled by a mobile controller 85 to be described later. The mobile controller 85 is for controlling the frequency of the local oscillation signal LO. The channel indicating signals have accordingly controlled frequencies changed in response to the change of the local oscillation signal LO, so as to successively indicate each of the up-link control channels allotted to the respective base stations 21, 22, and 23. Each channel indicating signal is used to monitor the field intensity at each base station, as mentioned in conjunction with FIGS. 5 and 6.

The local oscillation signal LO is also given to a receiver section 86 to reproduce a reproduced signal RP from a received down-link signal DW. Either the idle channel signal or the power control signal PW is included in the down-link signal DW. Both of the idle channel signal and the power control signal PW are sent to a signal detector 87 as a received idle channel signal and received control signal, respectively, after reproduced by the receiver section 86.

Supplied with the received idle channel signal, the signal detector 87 gives the mobile controller 85 the idle channel specified by the received idle channel signal. The mobile controller 85 supplies the synthesizer 84 with a channel setting signal CH to operate the synthesizer 84 at the frequency of the indicated idle channel in a usual manner.

When the received control signal is detected by the signal detector 87, a power control portion 88 of the mobile controller 85 is put into operation to energize a power setting circuit 89, such as an attenuator, a bias circuit, or the like. The power setting circuit 89 controls the transmitter section 81 to lengthen the communicable distance of the mobile station 30 by augmenting the output power of the transmitter section 81. As a result, the communicable zone 65 illustrated in FIG. 5 is spread to the communicable zone 66.

As will readily be understood from the above, the receiver section 86 serves to receive the power control signal PW while a combination of the signal detector 87, the power control portion 88, and the power setting circuit 89 serves to control the transmitter section 81 as regards the output power thereof.

Augmentation of the output power of the mobile station 30 enables the first base station 21 to receive the channel indicating signal through the up-link control channel allotted to the first base station 21, as described with reference to FIG. 6. The first base station 21 is similar in structure to the second base station 22 illustrated in FIG. 7 and sends the field detection signal DT to the control station 20. An idle channel of the first base station 21 is allotted to the mobile station 30 in the manner described before, provided that no traffic congestion takes place in the first base station 21.

The above operation is mainly described in connection with an originating call from the mobile station 30. Similar operation is carried out as regards a terminating call from one of the base stations to the mobile station 30.

Figure 10:
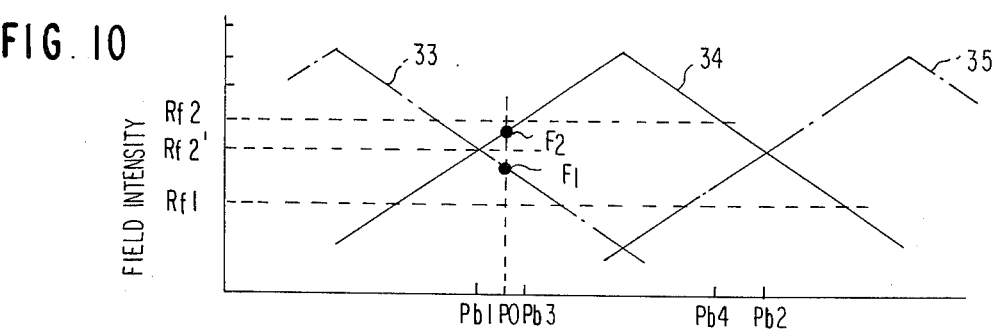
FIG. 10 is a graphical representation of a distribution of field intensity for use in describing a radio mobile communication system according to a third embodiment of this invention.

Referring to FIG. 10, description will be made of principles of a radio mobile communication system according to a third embodiment of this invention. In FIG. 10, field intensities and points corresponding to those illustrated in conjunction with FIG. 2 are designated by like reference numerals and symbols. The mobile station 30 is present at a point $P_0$ and the boundaries are formed at points $Pb_1$ and $Pb_2$.

As mentioned with reference to FIGS. 5 and 6, each base station has a plurality of channels including speech channels and a control channel. The control channel allotted to each base station is divided into down-link and up-link control channels. Each base station delivers an operation control signal with a base station output power through the down-link control channel to mobile stations present in each service area. The operation control signal serves to control operation of each mobile station and to measure the field intensity of each down-link control channel in each mobile station in this system. In this sense, the operation control signal may be the base station specifying signal as described in conjunction with FIGS. 1 and 2. Each mobile station detects each base station output power by monitoring the field intensity of the operation control signal.

On occurrence of traffic congestion, each base station informs the mobile stations present in the service area thereof of the occurrence of traffic congestion. The occurrence of traffic congestion is specified by an adjustment information signal transmitted through the wired circuits and each down-link control channel. The adjustment information signal may be identical with the power control signal PW described with reference to FIG. 7.

It is assumed here that each mobile station has a reference level $Rf_1$ (called a first reference level) to receive the operation control signal only when the operation control signal has a level higher than the first reference level $Rf_1$. The illustrated field intensities $F_1$ and $F_2$ at the point $P_0$ are specified by the operation control signals supplied from the first and the second base stations 21 and 22, respectively, and have higher levels than the reference level $Rf_1$. The mobile station 30 present at the position $P_0$ are therefore communicable with both of the first and the second base stations 21 and 22. However, the mobile station 30 is connected to the second base station 22 by selecting a greater field intensity of the field intensities $F_1$ and $F_2$ in a usual manner as long as traffic congestion does not take place in the second base station 22.

Now, let the first reference level $Rf_1$ be raised in the mobile station 30 to a second reference level $Rf_2$, only as regards the operation control signal supplied from the second base station 22, during traffic congestion of the second base station 22. In other words, the first reference level $Rf_1$ is kept intact as regards the other operation control signals supplied from the other base stations.

Under the circumstances, the field intensity $F_2$ has a lower level than the second reference level $Rf_2$. As a result, the mobile station 30 is no more communicable with the second base station 22. Instead, the mobile station 30 is communicable with the first base station 21 because the field intensity $F_1$ is kept higher than the first reference level $Rf_1$.

In FIG. 10, similar operation is possible even when the first reference level $Rf_1$ is increased to an intermediate level $Rf_1'$ lower than the second reference level $Rf_2$, if a difference between the first intensity level $F_1$ and the first reference level $Rf_1$ becomes larger than a difference between the second intensity level $F_2$ and the intermediate level $Rf_2'$. This means that the service areas of the second base station 22 and the neighboring or the first base station 21 are narrowed and widened, respectively, to shift the boundaries to points $Pb_3$ and $Pb_4$. At the same time, the communicable distance of the mobile station 30 is shortened for the second base station 22 and lengthened for the first base station 21.

Figure 11:
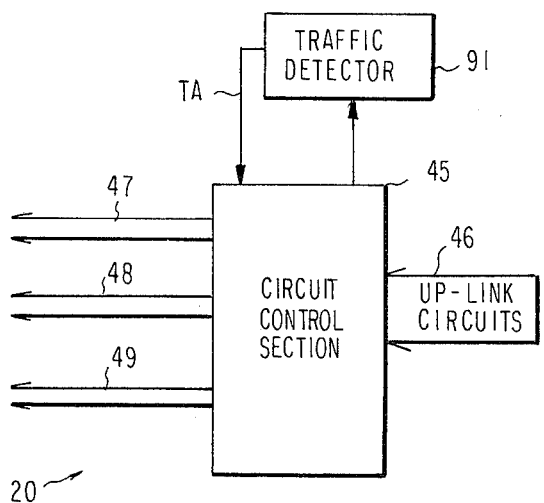
FIG. 11 is a block diagram of a control station for use in the system according to the third embodiment of this invention.

Referring to FIG. 11, the control station 20 for use in the system accoding to the third embodiment of this invention comprises similar parts designated by like reference numerals. A combination of the traffic measuring circuit 51, the threshold circuit 52, and the monitoring circuit 53 is depicted as a traffic detector 91. The traffice detector 91 delivers traffic adjusting signals TA to the respective down-link circuits 47 to 49 through the circuit control section 45. The traffic adjusting signal TA supplied to each base station takes first and second signal values when the current traffic for that base station exceeds the threshold traffic and does not, respectively. The first and the second values can be regarded to represent a degree of congestion in each base station and are represented by a predetermined number of bits, such as four or eight bits.

Figure 12:
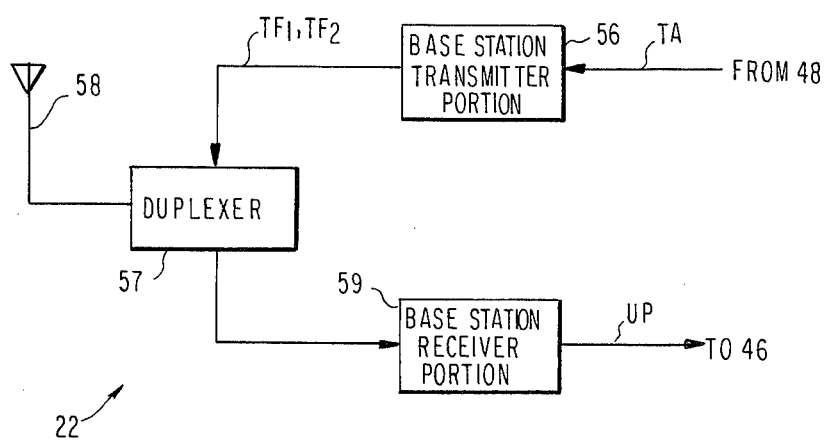
FIG. 12 is a block diagram of a base station for use in combination with the control station illustrated in FIG. 11.

Referring to FIG. 12, each base station, typically the second base station 22, is for use in combination with the control station 20 and comprises similar parts designated by like reference numerals. The base station transmitter portion 56 is supplied with the traffic adjusting signal TA as a received traffic signal to produce an adjustment information signal which takes first and second reception values corresponding to the first and the second signal values, respectively. The first and the second reception values are transmitted as first and second traffic signals $TF_1$ and $TF_2$ through the down-link control channel towards the mobile stations present in the service area of the second base station 22. The operation control signal is also transmitted through the down-link control channel with the base station output power. Thus, the transmitter portion 56 serves to deliver the adjustment information signal to the mobile station 30. Inasmuch as the base station receiver portion 59 is similar in operation to that illustrated in FIG. 4, the receiver portion 59 will not be described any longer.

Figure 13:
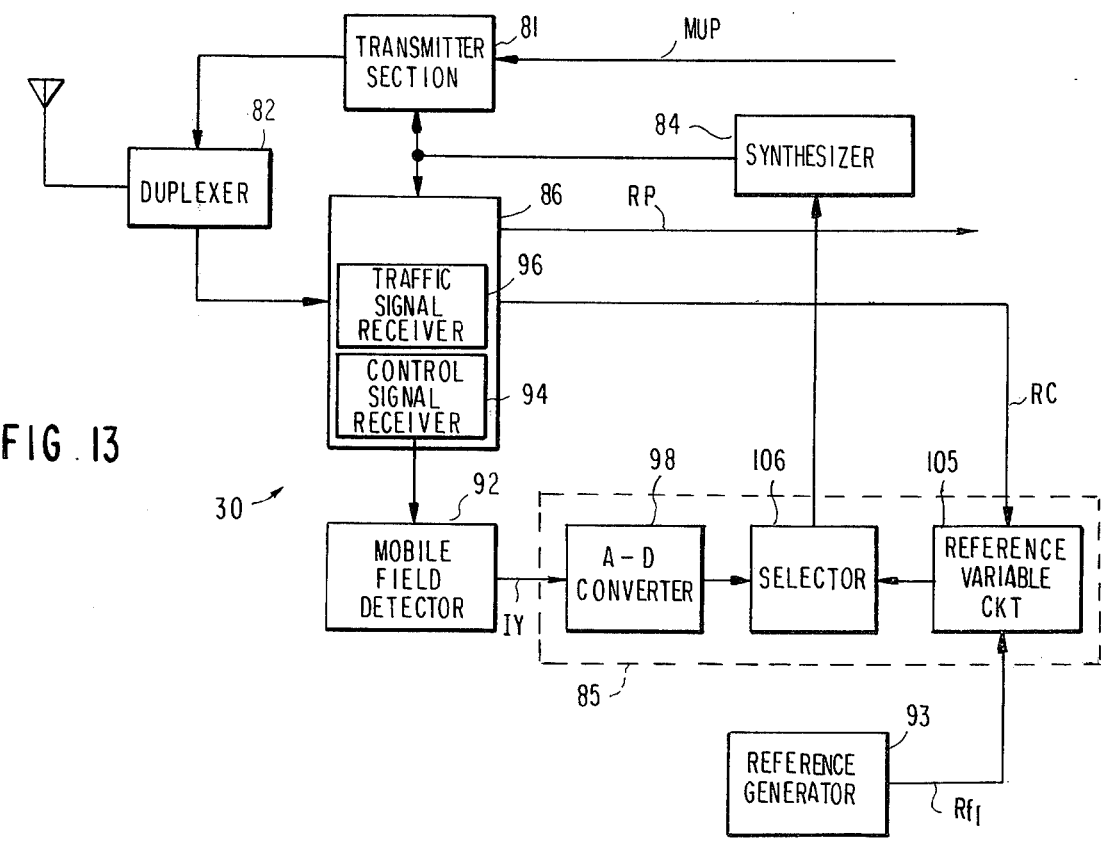
FIG. 13 is a block diagram of a mobile station communicable with the base station illustrated in FIG. 12.

Referring to FIG. 13, the mobile station 30 used in combination with the base station 22 shown in FIG. 12 is similar to that illustrated with reference to FIG. 9 except that a mobile field detector 92 and a reference generator 93 are substituted for the signal detector 87 with the power setting circuit 89 removed from FIG. 13. The receiver section 86 comprises a control signal receiver 94 for receiving the operation control signals delivered thereto to control operation of each mobile station. Herein, the base station specifying signals are supplied as the control signals to the mobile field detector 92, as mentioned in conjunction with FIG. 10. The mobile field detector 92 measures the field intensities of the operation control signals received by each mobile station to produce field intensity signals IY representative of the measured field intensities. Each field intensity signal IY is produced in an analog fashion.

The receiver section 86 comprises a traffic signal receiver 96 for receiving the adjustment information signals delivered thereto to produce an information reception signal RC. It is surmised that the information reception signal RC appears from the traffic signal receiver 96 only when the first traffic signal $TF_1$ is supplied as the adjustment information signal to the traffic signal receiver 96. The information reception signals RC are supplied to the mobile controller 85 together with the field intensity signals IY. In addition, the receiver section produces a reproduced signal RP, as is the case with the mobile station illustrated in FIG. 9.

The mobile controller 85 selects one of the base stations, namely, the first base station, the service area of which partly overlaps the service area of the second base station 22 in the following manner.

Referring to FIG. 13 again and FIG. 14 afresh, operation of the mobile controller 85 will be described in detail. In the mobile controller 85, the field intensity signals IY are converted into digital signals by the use of analog to digital converter 98. AS a result, the electric field distribution 33, 34, and 35 illustrated in FIG. 10 are quantized into those depicted at 101, 102, and 103, respectively, when no traffic congestion takes place in every base station and, therefore, no first traffic signal is received as the adjustment information signal by the mobile stations. As to the mobile station 30 present at the point $P_0$, the field intensities $F_1$ and $F_2$ shown in FIG. 10 are received at first and second intensity levels $FD_1$ and $FD_2$, respectively.

The reference generator 93 produces a first reference signal $Rf_1$ representative of the first reference level depicted at $Rf_1$ in FIG. 10. The mobile controller 85 comprises a reference variable circuit 105 supplied from the reference generator 93 and the traffic signal receiver 96. The reference variable circuit 105 raises the first reference level $Rf_1$ to the second reference level depicted at $Rf_2$ in FIG. 10, only on reception of the adjustment information signal, to produce a second reference signal $Rf_2$ (not shown) representative of the second reference level $Rf_2$. Otherwise, the reference variable circuit 105 produces the first reference signal $Rf_1$ without varying the signal received from the reference generator 93. The first and the second reference signals $Rf_1$ and $Rf_2$ successively appear from the reference variable circuit 105 on searching the first and the second base stations 21 and 22, respectively.

Coupled to the analog to digital converter 98 and the reference variable circuit 105, a selector 106 selects one of the base stations 21 through 23 by successively monitoring the first and second intensity levels $FD_1$ and $FD_2$ with reference to the fist and the second reference levels, $Rf_1$ and $Rf_2$, respectively.

Thus, the second reference level $Rf_2$ is referenced as regards the second base station 22 which produces the adjustment information signal. This means that the field intensity distribution depicted at 102 in FIG. 14 is equivalently reduced to a first intensity distribution indicated by a dashed line 108 by three of unit intensity levels sealed along the ordinate. Therefore, the second intensity level $FD_2$ at the point $P_0$ is lowered to a third intensity level $FD_3$. It should be noted that a dash-dot line 109 drawn below the dashed line 108 is a portion of the quantized level 101.

Figure 14:
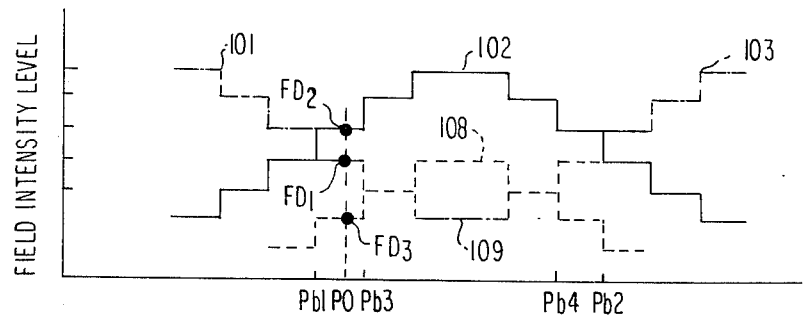
FIG. 14, drawn below FIG. 11 for convenience of description, shows a graph for describing characteristics of a mobile controller used in the mobile station illustrated in FIG. 13.

In FIG. 14, the first intensity level $FD_1$ at the point $P_0$ is higher than the third intensity level $FD_3$. The selector 106, therefore, selects the first base station 21 instead of the second base station 22.

Either addition or subtraction between the intensity level and the first or the second reference level may be carried out to select a pertinent one of the base stations in the selector 106. Inasmuch as the first traffic signal $TF_1$ is representative of a degree of congestion, as described with reference to FIG. 10, the reference variable circuit 105 may be controlled in accordance with the degree of congestion. Although the first reference level $Rf_1$ is increased in conjunction with the mobile stations present in the service area of the second base station 22 in which traffic congestion takes place, the first reference level is reduced in the other mobile stations present in a neighboring one of the base stations, the service area of which partly overlaps the second base station 22.

While this invention has thus far been described in conjunction with a few embodiments thereof, it is readily possible for those skilled in the art to put this invention into effect in various other manners. For example, it is possible to combine at least two of the systems illustrated with reference to FIGS. 1, 5, and 10. Each mobile station may not only be an automobile, namely, land mobile but also a ship or the like. A data stream may be transmitted through each speech channel. More than three base stations may be arranged in the system with each service area of the base stations partly overlapped to each other.

What is claimed is:

1. In a mobile radio communication system comprising a control station and a plurality of base stations controlled by said control station and having service areas, respectively, each service area partly overlapping at least one of the other service areas, each base station being allotted with a plurality of channels for use in radio communication with a plurality of mobile stations which are present in the service area of said each base station and each of which has a communicable distance, the number of channels currently used in the radio communication defining a current traffic for said each base station, the improvement wherein:

said control station comprises:

threshold means for generating a threshold signal representative of a threshold traffic predetermined for each base station;

measuring means coupled to said base stations for measuring the current traffics for the respective base stations to produce a plurality of traffic signals representative of the measured current traffics, respectively; and monitoring means coupled to said base stations and responsive to said threshold signal and said traffic signals for monitoring the measured current traffics with at least one threshold traffic predetermined for said base stations to supply a traffic adjusting signal to a particular one of said base stations when the current traffic defined for said particular base station exceeds the threshold traffic predetermined therefor and furthermore when the current traffic defined for an adjacent one of said base stations, the service area of which partly overlaps the service area of said particular base station, does not exceed the threshold traffic for said adjacent base station;

said system further comprising varying means operable in at least a predetermined one of first and second modes of operation in response to said traffic adjusting signal, said varying means varying the service area of said particular base station in said first mode of operation, said service area being defined by each base station's transmission output power, said varying means varying, in said second mode of operation, the communicable distance of each mobile station present in the service area of said particular base station.

2. A mobile radio communication system as claimed in claim 1, each base station comprising base station transmission means for carrying out radio transmission with a station output power towards the mobile stations present in the service area thereof, said output power defining the last-mentioned service area, wherein said varying means comprises in each base station:

adjusting signal receiving means for receiving a particular one of the traffic adjusting signals, that is supplied to the last-mentioned each base station, to produce a received adjustment signal; and power control means coupled to said base station transmission means and responsive to the received adjustment signal for reducing said output power thereby to vary the service area of the last-mentioned each base station.

3. A mobile radio communication system as claimed in claim 1, each mobile station comprising mobile station transmission means for carrying out radio transmission with a mobile output power which defines said communicable distance, wherein said varying means comprises:

in each base station:

adjusting signal receiving means for receiving a particular one of the traffic adjusting signals, that is supplied to the last-mentioned each base station, to produce a received adjustment signal; and transmitting means for transmitting a power control signal in response to said received adjustment signal towards the mobile stations present in the service area of the last-mentioned each base station; and in each mobile station:

signal receiving means for receiving said power control signal to produce a received control signal; and control means coupled to the mobile station transmission means of the last-mentioned each mobile station and responsive to said received control signal for controlling the mobile station transmission means to lengthen the communicable distance of the last-mentioned each mobile station.

4. A mobile radio communication system as claimed in claim 1, the channels allotted to each base station including a control channel for each mobile station present in the service area thereof, each base station comprising signal delivering means for delivering operation control signals with a station output power through the control channels to the respective mobile stations present in the service area thereof, each mobile station comprising control signal receiving means for receiving the control signals delivered thereto to control operation thereof, wherein said varying means comprises:

in each base station:

adjusting signal receiving means for receiving a particular one of the traffic adjusting signals, that is supplied to the last-mentioned each base station, to produce a received adjustment signal; and adjustment information delivering means coupled to the signal delivering means of the last-mentioned each base station and responsive to the received adjustment signal for making the signal delivering means coupled thereto deliver adjustment information signals through the control channels to therespective mobile stations present in a particular one of said service areas that the last-mentioned each base station has; and in each mobile station:

field measuring means coupld to the control signal receiving means thereof for measuring a field intensity of the operation control signal received thereby to produce a field intensity signal representative of the measured field intensity;

adjustment information receiving means for receiving the adjustment information signal delivered thereto to produce an information reception signal; and selecting means responsive to said field intensity signal and said information reception signal for selecting one of said base stations.

5. A mobile radio communication system as claimed in claim 4, each mobile station comprising reference level means for determining a first reference level to produce a first reference signal representative of said first reference level, wherein said selecting means comprises:

reference variable means coupled to said adjustment information receiving means and said reference level means for raising the first reference level to a second reference level higher than said first reference level, only on reception of said adjustment information signal to produce a second reference signal representative of said second reference level and, otherwise, to produce said first reference signal; and selctor means coupled to said field measuring means and said reference variable means for selecting one of said base stations by monitoring said field intensity signal with reference to either of said first and said second reference signals, whereby the communicable distance is shortened for said particular base station and lengthened for a neighboring one of said base stations with the service areas of said particular and said neighboring stations narrowed and widened, respectively, said neighboring base station having the service area partly overlapping the service area of said particular base station.

* * * * *